United States Patent [19]

Zisa et al.

[11] 3,796,953

[45] Mar. 12, 1974

[54] SOLID STATE POTENTIAL INDICATOR FOR WATTHOUR METERS

[75] Inventors: William J. Zisa; Theodore M. McClelland, III, both of Cary, N.C.

[73] Assignee: Westinghouse Electric Corporation, Pittsburgh, Pa.

[22] Filed: Nov. 23, 1971

[21] Appl. No.: 201,470

[52] U.S. Cl. .............................. 324/137, 324/133
[51] Int. Cl. ......................................... G01n 11/02
[58] Field of Search................... 324/137, 133, 96; 340/252 R, 248 R; 250/217 SS

[56] References Cited
UNITED STATES PATENTS
2,913,667  11/1959  Lenehan ............................ 324/137
2,866,158  12/1958  Petzinger ............................ 324/137
3,534,354  10/1970  Galginaitis ....................... 324/133 X
3,665,442   5/1972  Brooks ............................ 340/248 R

OTHER PUBLICATIONS

Electronics; 10-13-69; pp. 159 & 160.

Prusik et al.; IBM Tech. Bul.; P. 883, 11-69.

Primary Examiner—Alfred E. Smith
Attorney, Agent, or Firm—R. W. Smith

[57] ABSTRACT

A solid state potential indicator for watthour meters is mounted on the front of the meter movement. Solid state light emitters are oriented for direct viewing within the normal meter reading viewing area.

3 Claims, 5 Drawing Figures 3,796,953

SOLID STATE POTENTIAL INDICATOR FOR WATTHOUR METERS

BACKGROUND OF THE INVENTION

1. Field of the Invention

This invention relates to an improved light indicator for watthour meters, and more particularly, to a potential indicator having solid state light emitters mounted for direct visual display within the enclosure of a watthour meter.

DESCRIPTION OF THE PRIOR ART

It is known to include potential indicators of the incandescent lamp type in watthour meters for monitoring proper operation of the meter. Prior to the present invention, the indicator lamps were typically mounted behind the faceplate assembly of the watthour meter. Since the normally cylindrical space within a watthour meter enclosure is almost entirely occupied by the meter movement, and due to the size of the indicator lamps, there was not sufficient room to mount the lamps adjacent the face of enclosure. Accordingly, only reflected light from the indicator lamps is viewed when the watthour meter is observed unless viewed very closely.

Some difficulty has been found in previous potential indicator lamp arrangements when they are mounted in outdoor locations and are subjected to sunlighted conditions which present a high level of background lighting for the illumination of the lamps. In such instances, observation of the lighted condition of the potential indicator lamps is difficult even at close distances. Further difficulty in the use of incandescent lamps is that the lamp filaments are subject to failure by being burned out since the watthour meter is continuously energized. This requires servicing and also provides an erroneous indication that the meter is not operating properly or that electrical power is not being applied effectively to the meter.

SUMMARY OF THE INVENTION

A solid state potential indicator for a watthour meter includes a mounting plate attached to the front of the watthour meter frame and carrying solid state light emitters within the normal meter reading field of view, including the faceplate assembly. The solid state light emitters are connected across the meter potential coils for continuous illumination in response to the normally continuously energized condition of the potential coils. It is an important feature of this invention that the solid state light emitters have a substantially reduced size suitable for providing a compact potential indicator mounting arrangement. Solid state light emitters are further advantageously utilized in the present invention since they are not subjected to the limited filament life of incandescent lamps, and are highly efficient in operation so as to require low levels of power consumption.

DESCRIPTION OF THE PREFERRED EMBODIMENT

Figure 1:
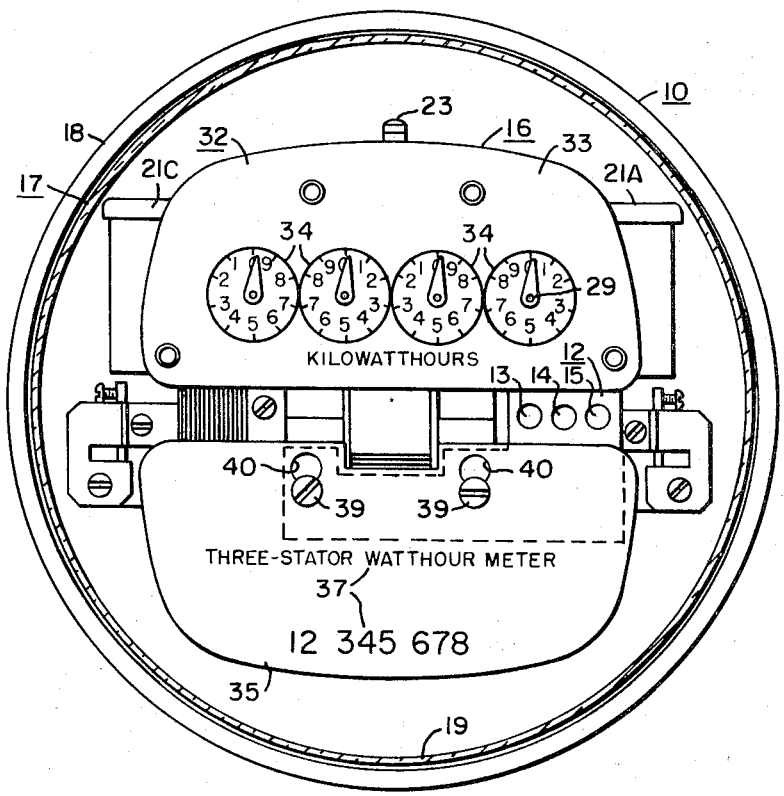
FIG. 1 is a front elevational view of a watthour meter including the solid state potential indicator of this invention.
Figure 2:
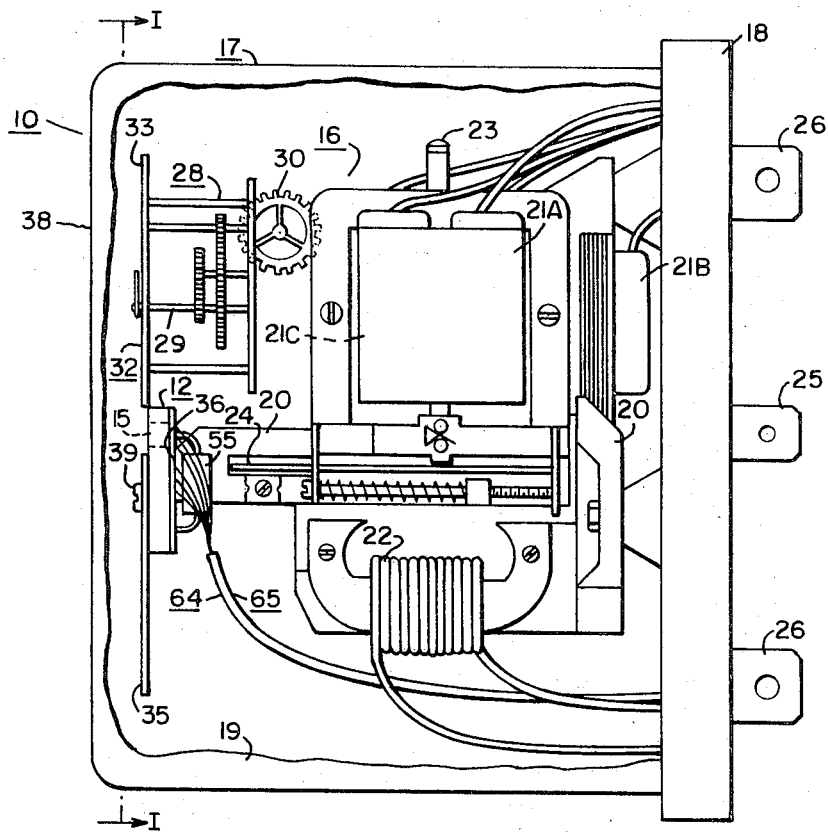
FIG. 2 is a side elevational view of the watthour meter shown in FIG. 1.

Referring to the drawing, and more particularly to FIGS. 1 and 2, an induction watthour meter 10 is illustrated including a solid state potential indicator 12 made in accordance with this invention. Solid state light emitters 13, 14 and 15 are included in the potential indicator 12, and are connected to the metering circuit of the watthour meter 10.

The watthour meter 10 is of a conventional type, and in one preferred embodiment includes a polyphase meter having an electro-responsive meter movement 16 housed within an enclosure 17 including a molded base 18 and a cup-shaped glass cover 19.

A metal frame 20 supports the parts of the meter movement 16 and is attached at a rearward portion thereof to the base 18. The body of the frame 20 generally includes an electromagnetic stator arrangement including potential coils 21A, 21B and 21C. In a conventional manner, each of the potential coils 21A, 21B and 21C has an associated current coil, for example, current coil 22 is illustrated associated with the potential coil 21A on a common electromagnetic stator. The body of the frame 20 also supports the rotor portion of the meter 10 including a shaft at an upper end in a bearing support 23 and meter disk 24 carried by the shaft.

Each of the potential coils 21A, 21B and 21C is connected to voltage blade connectors 25, and each of the current coils, such as 22, is connected to current blade connectors 26. The connectors 25 are included since the meter 10 illustrated is a transformer type; however, they are not included in self-contained meters also using the present invention. The blade connectors 25 and 26 are receivable by mating jaw connectors of a meter socket, not shown, for connection of the watthour meter 10 to a polyphase power line.

The forward part of the meter movement 16 includes a register 28 having pointer shafts 29. The shafts 29 are rotatable through a gearing arrangement 30 in response to rotation of the meter shaft.

A faceplate assembly 32 includes a first section formed by a register dial plate 33 having a series of numerical markings 34 associated with each of the pointer shafts 29. A name plate 35, forming a second section of the faceplate assembly 32, is fastened to the forward end 36 of the frame 20 immediately below the register plate 33 and in a plane substantially parallel thereto. The name plate 35 conventionally includes identifying indicia 37 designating the type of the watthour meter 10 and an identifying serial number. The faceplate assembly 32 may include a single plate, in which case the dial plate 33 and name plate 35 are included in two sections of a common plate.

In the watthour 10 shown in FIGS. 1 and 2, the name plate 35 is spaced from the bottom of the dial plate 33. The front face of the glass cover 19 defines a meter reading window portion 38 thereof for viewing of the dial plate 33 and the name plate 35. The name plate 35 is attached to the forward projecting end 36 of the frame 20 by a pair of screws 39 applied through a pair of keyhole shaped holes 40 formed adjacent the upper edge in the name plate 35.

Figure 3:
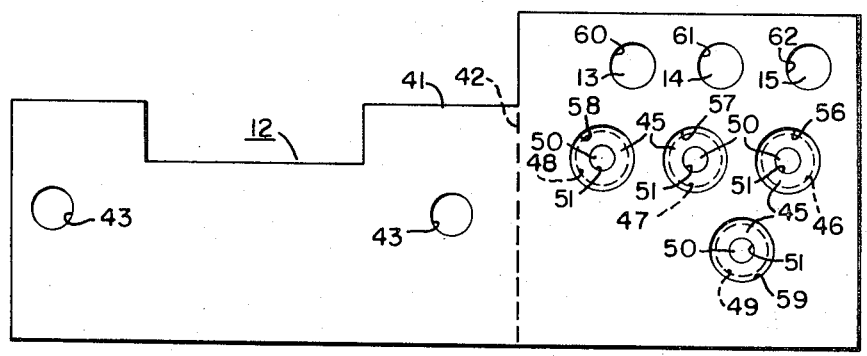
FIG. 3 is a front view of the solid state potential indicator of this invention shown in FIG. 1.
Figure 4:
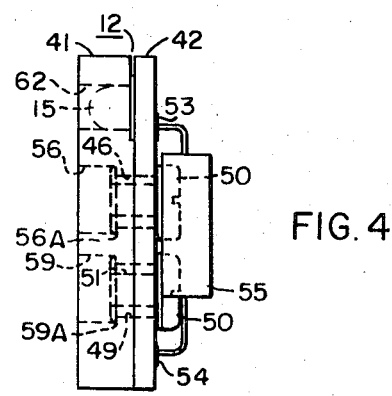
FIG. 4 is a side elevational view of the solid state potential indicator shown in FIG. 3.

Referring now to FIGS. 3 and 4, the potential indicator 12 is shown including a mounting plate 41 for securing the potential indicator 12 to the meter movement 16 and for supporting a circuit board 42 having the solid state light emitters 13, 14 and 15 mounted thereon. The mounting plate 41 is formed by a thin sheet of insulating material, such as phenolic or a suitable plastic material and is adapted to extend sidewardly behind the name plate 35. A pair of mounting holes 43 are spaced so as to receive the screws 39. Accordingly, the rear face of the mounting plate 41 rests against the end 36 of the frame 20, and is clamped thereto by the name plate 35 and the screws 39 threaded to complementary holes of the frame end 36.

The rear face of the right side of the mounting plate 41, as viewed in FIG. 3, has the circuit board 42 attached thereto by means of a series of rivets 45. The circuit board 42 is made of a thin sheet of insulating material such as used for printed circuit boards. The circuit board 42 includes printed circuit conductors indicated by wide lines in the electrical circuit diagram of FIG. 5. Four circular holes 46, 47, 48 and 49 are formed in the circuit board 42. Each of the holes 46, 47, 48 and 49 is adapted to receive one of the rivets 45 and has an associated conductive printed circuit ring, designated 46A, 47B, 48A and 49A, disposed around one edge thereof on the rear face. The bottom of a head of one of the screws 50 will make electrical contact with the conductive rings when applied to the threaded bores 51 extending through the center of each of the rivets 45.

The circuit board 42 further includes a printed circuit conductor 53 extending to one side and generally parallel to the holes 46, 47 and 48. A second printed circuit conductor 54 extends on the opposite side of the holes 46, 47 and 48 and extends substantially parallel to the conductor 53. The conductor 54 is formed in electrical contact with the conductive ring 49A surrounding the hole 49.

Figure 5:
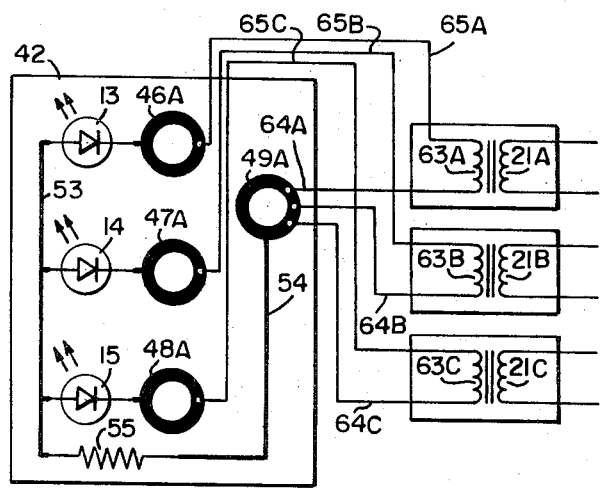
FIG. 5 is an electrical schematic diagram for connecting the solid state potential indicator to the watthour meter shown in FIG. 1.

The circuit board 42 is usually mounted to the mounting plate 41 after the solid state light emitters 13, 14 and 15 are mounted on the board 42 and are electrically connected to the associated printed conductors as shown in the schematic diagram of FIG. 5. In one preferred embodiment the solid state light emitters 13, 14 and 15 include visible red light emitting diodes having common anode terminals connected to the printed circuit conductor 53 and cathode terminals each connected to the conductive rings 46A, 47A, and 48A, respectively. A current limiting resistor 55 is connected across the conductors 53 and 54 so as to be connected in series with each of the solid state light emitters 13, 14 and 15.

The mounting plate 41 includes a series of holes 56, 57, 58 and 59, each provided with an annular shoulder indicated at 56A and 59A in FIG. 4. The holes 56, 57, 58 and 59 are oriented for concentric alignment with the holes 46, 47, 48 and 49 of the circuit board 42. Accordingly, rivets 45 are applied to the holes 56, 57, 58 and 59 so that the head portions rest on the annular shoulders indicated by numerals 56A and 59A in FIG. 4. Accordingly, the body of the rivets extends into the printed circuit board holes 46, 47, 48 and 49 for receiving the screws 50.

The mounting plate 41 further includes three apertures 60, 61 and 62 adapted to receive a lens portion of each of the solid state light emitters 13, 14 and 15, respectively. Accordingly, the lens portion of the solid state light emitters is recessed within the apertures 60, 61 and 62 serving to intensify and concentrate the illumination of the solid state light emitters 13, 14 and 15. In one preferred embodiment, the front face of the mounting plate 41 is made a dark color or black providing a high contrasting background for making the illumination of the light emitters distinctly noticeable when viewing the meter reading window portion 38 from considerable distances. The circuit board 42 is clamped to the mounting plate 41 by the terminal screws 50 applied through the holes 46, 47, 48 and 49 and threaded into the internally threaded bores of the rivets 45.

With the solid state light emitters 13, 14 and 15 and the resistor 55 mounted on the circuit board 42, the potential indicator 33 forms a convenient assembly for attachment to the forward end 36 of the meter frame 20. Affixing the mounting plate 41 by securing the name plate 35 with the pair of screws 39 exposes the solid state light emitters 13, 14 and 15 within the spaced opening between the dial plate 33 and the name plate 35 and, therefore, within the area circumscribed by the outer edges of the faceplate assembly 32.

Each of the solid state light emitters 13, 14 and 15 are connected across the potential coils 21A, 21B and 21C as indicated in FIG. 5. A secondary coil 63A, 63B and 63C is transformer-coupled respectively with the potential coils 21A, 21B and 21C. This is provided by winding additional turns on the core supporting the potential coils. Wire lead conductors 64A, 64B and 64C are each connected at one end with one terminal of the coils 63A, 63B and 63C at connections, not shown, on the base 18 and at each opposite end to the terminal screw 50 applied to the hole 49 and engaging the conductive ring 49A of the circuit board 42. Wire lead conductors 65A, 65B and 65C are connected at one end at the connections on base 18 of the coils 63A, 63B and 63C and are connected at each opposite end, respectively, to the terminal screws 50 associated with the holes 46, 47 and 48 and engaging the conductive rings 46A, 47A and 48A so as to make connection with the cathode terminals of the solid state light emitters 13, 14 and 15, respectively.

With the potential indicator 12 mounted to the watthour meter movement 16 and connected to the potential coils 21A, 21B and 21C as described hereinabove, the illumination of the solid state emitters is clearly and distinctly visible by direct viewing of the faceplate assembly 32 to indicate that the potential coils are properly energized and conducting and that the watthour meter 10 is being energized by a power line associated therewith.

In one preferred embodiment the solid state light emitters 13, 14 and 15 are each a type MV10B light emitting diode available from the Monsanto Company, and have a rated voltage of 1.65 volts. The current limiter resistor 55 has a value of 4.7 ohms so that when the solid state light emitters are connected to a source of 1.35 volts, a nominal of 1.3 volts is developed across the light emitting diode devices. The resistor 55 may be omitted; however, for more reliable service where the meter 10 can be subjected to severe overvoltage surges, it is preferable to use such a resistor. The use of the resistor 55 has an additional advantage of reducing the operating voltage for extending the service life of the diode light emitters 13, 14 and 15. These diode devices are required to be continuously energized due to the continuous monitoring of power by the watthour meter 10, and it is believed that these devices are capable of operation from between 20 to 30 years without replacement under normal operating conditions.

While the embodiment disclosed hereinabove constitutes a preferred form, it is apparent that other forms may be adopted which are within the spirit and scope of this invention.

We claim:

1. In a watthour meter having an enclosure with a transparent meter reading window portion, a frame, an electro-responsive meter movement, carried on said frame, plural electro-magnetic potential coils, a register having an indicator means, and a faceplate assembly having first and second separate sections viewable through said window portion when said first section is mounted on said register and behind said indicator means and when said second section is mounted to a forward end part of said frame, a potential indicator for providing visual indications of the energization of each of said potential coils, said potential indicator comprising: an insulated mounting plate secured to said forward end part of said frame so as to expose a portion thereof immediately adjacent said faceplate assembly, the exposed portion having plural recessed areas; a plurality of solid state light emitters corresponding in number to the number of said plural potential coils and disposed in said recessed areas of said exposed portion of the mounting plate so as to be in a recessed relationship thereto for direct viewing through said window portion; printed circuit means disposed at the rear of said exposed portion of said mounting plate and having printed conductive portions thereof connected between the solid state emitters and terminal contacts formed integrally in said printed conductive portions; and conductor means detachably connected to said terminal contacts of the printed conductive portions connecting each of said solid state light emitters across an illuminating voltage developed by a separate one of said potential coils so that each light emitter is lit in response to a normal energized condition of an associated potential coil.

2. In a watthour meter as claimed in claim 1, wherein each of said recessed areas of said exposed portion of the mounting plate is formed by an aperture receiving one of said solid state light emitters so as to distinctly display the illumination of said solid state light emitters and wherein said printed circuit means includes a separate circuit board attached to said mounting plate and carrying each of the light emitters on one side thereof for mounted positioning in one of said apertures and further carrying said printed conductive portions on an opposite side thereof to permit access for detachably connecting said conductor means to said terminal contacts.

3. In a watthour meter as claimed in claim 2, wherein said mounting plate and circuit board include mutually aligned hole openings therein, said hole openings of said circuit board being disposed immediately adjacent each of said terminal contacts of said printed conductive portions, and including a screw fastener means extending into said mutually aligned hole openings and being releasably secured to the sides of the hole openings of said mounting plate so as to concurrently clamp said circuit board to said mounting plate and detachably connect said conductor means to said terminal contacts.

* * * * *